United States Patent Office 3,284,033
Patented Nov. 8, 1966

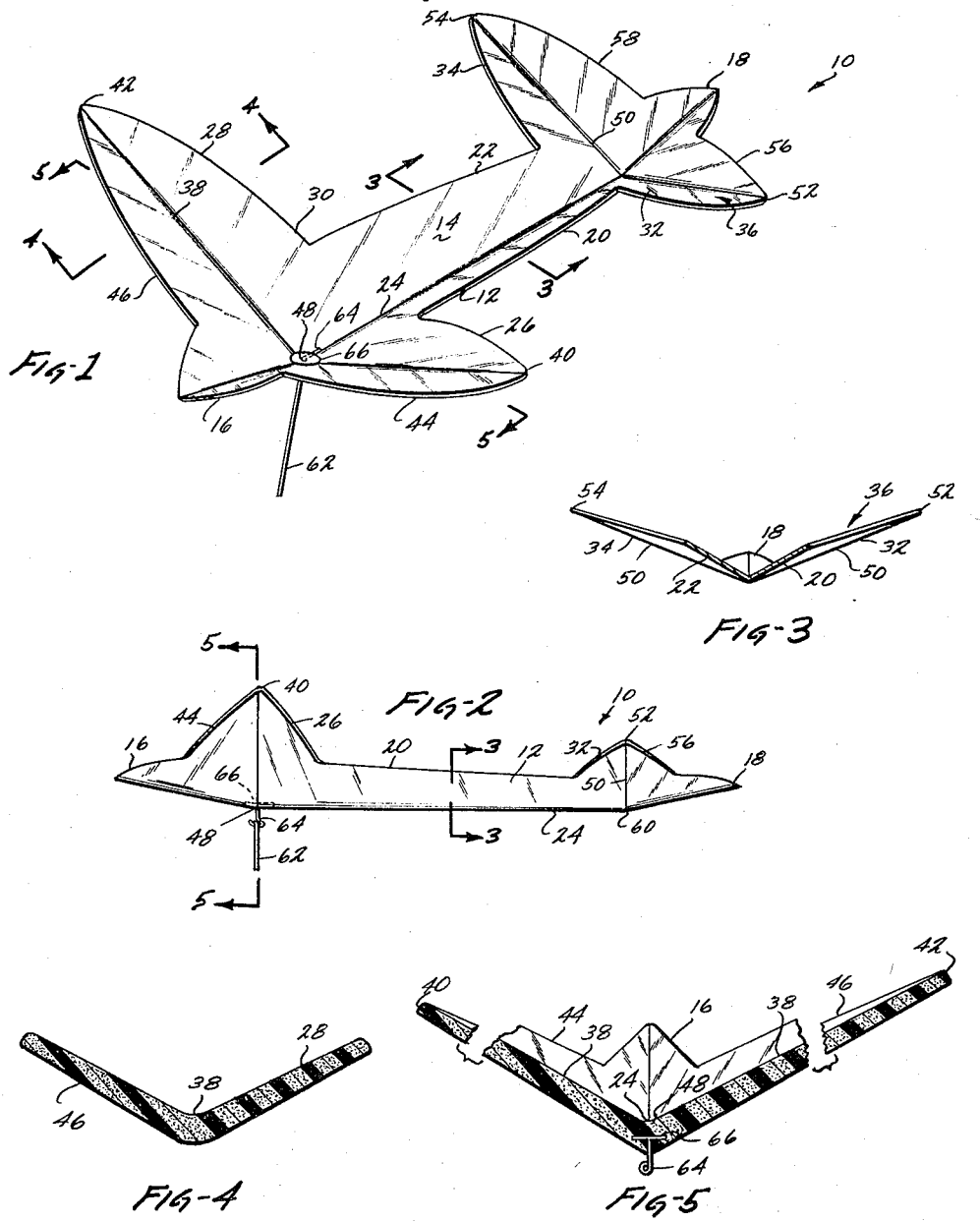

3,284,033
AIRPLANE KITE APPARATUS
Joseph L. Ventre, 601 E. Fairview Blvd., Inglewood, Calif.
Filed Apr. 19, 1965, Ser. No. 448,933
8 Claims. (Cl. 244—154)

This invention relates generally to tethered, aerodynamically sustained craft and more particularly to kite type apparatus having more or less the general form of a conventional airplane.

Although the present invention finds particularly advantageous application in the field of toy kites; and, although, in the cause of clarity and brevity, much of the following discussion and description of examples of the invention relate thereto, it is to be understood that the advantages of the invention are manifest equally as well in other fields of tethered aerodynamic flight such as, for example, military reconnaissance kites, rescue markers, and radio or radar targets, beacons, relays, antennae, or the like.

It is a primary object of the invention to provide such kite apparatus which does not require a kite tail, per se, for stability regardless of the supporting wind velocity, and which is fabricated in a one-piece, monolithic form without a frame and without a bow or bow string.

It is another object to provide such kite apparatus which utilizes an improved airfoil causing such improved stability as to eliminate the conventional requirement for a string bridle.

It is another object to provide such a kite device which may be stamped or vacuum formed from sheet plastic or metal or which may be molded of lightweight formaceous materials.

It is another object to provide such apparatus which may be exceedingly easily prepared for flight and which may be launched easily and quickly by an unskilled operator.

It is another object to provide such apparatus which, while being strong and durable, is inexpensive to manufacture.

It is another object to provide such a kite device which has the general configuration of a conventional airplane.

Briefly, these and other objects are achieved in accordance with the structural concepts of the invention in one example thereof which includes a monolithic body formed from plastic sheet material. The body comprises an elongated fuselage portion, a wing portion, and a horizontal elevator portion. The wing and elevator portion are disposed transversely to the length of the fuselage contiguously to the nose and tail ends thereof respectively.

The body may be considered as being divided by three fold lines: the first is along the longitudinal centerline of the fuselage portion from nose to tail in a manner to form a keel, with the wing halves, fuselage sides, and elevator halves intersecting therealong in a dihedral angle relationship. A second fold line is formed along the length of the wing portion whereby the forward or leading half thereof and the nose of the fuselage portion is bent upwardly with respect to the rear or trailing half of the wing so that the wing cross section has a dihedral angle formed therein.

Similarly, the rear or trailing half of the elevator and, in this example, the tail of the fuselage portion is bent upwardly with respect to the forward, leading half of the elevator about a fold line extending from tip to tip of the elevator portion and substantially orthogonally to the fuselage centerline. In this manner the cross section of the elevator, taken parallel to the fuselage centerline, also forms a dihedral angle.

The overall configuration of this example of the invention, then, is a fuselage with a dihedral keel and having upwardly bent wings as viewed in a frontal elevation. From a side elevation, the craft is seen to have the nose and leading half of the wing bent upwardly and, similarly, the tail and rear half of the elevator bent upwardly.

A tether string may be affixed to the keel at approximately its intersection with the wing fold line.

Further details of these and other novel features and their operation as well as additional objects and advantages of the invention will become apparent and be best understood from a consideration of the following description taken in connection with the accompanying drawing which is presented by way of illustrative example only and in which:

FIGURE 1 is a perspective view of an example of one form of an airplane kite apparatus constructed in accordance with the principles of the present invention;

FIGURE 2 is a side elevational view of the structure of FIGURE 1;

FIGURE 3 is a cross sectional view of the structure of FIGURE 1 and FIGURE 2 taken along the section reference lines 3—3 thereof;

FIGURE 4 is a cross sectional view of the structure of FIGURE 1 taken along the section reference lines 4—4 thereof; and FIGURE 5 is a cross sectional view of the structure of FIGURE 1 and FIGURE 2 taken along the section reference lines 5—5 thereof.

With specific reference now to the figures in detail, it is stressed that the particulars shown are by way of example and for purposes of illustrative discussion only and are presented in the cause of providing what is believed to be the most useful and readily understood description of the principles and conceptual aspects of the invention. In this regard, no attempt is made to show structural or compositional details of the apparatus in more detail than is necessary for a fundamental understanding of the invention, the description taken with the drawing making apparent to those skilled in the arts of plastics fabrication and kite design how the several forms of the invention may be embodied in practice. Specifically, the detailed showing is not to be taken as a limitation upon the scope of the invention which is defined by the appended claims forming, along with the drawing, a part of this specification.

In FIGURE 1, the example of the kite apparatus 10 presented is seen to be fabricated in a substantially monolithic sheet form having the overall shape of the plan silhouette of a conventional airplane. The kite 10 includes a body member 12 having a fuselage 14 with a nose portion 16 and a tail portion 18. The fuselage 14 comprises a port, or left portion 20 and a starboard, or right, portion 22 which are symmetrically divided by a keel forming fold line 24.

At the keel fold line 24, the fuselage halves 20, 22 form a dihedral angle; and respective ones of the fuselage halves are coplanar with the left and right trailing portions 26, 28 of a wing 30 and, respectively, with the left and right leading portions 32, 34 of a horizontal elevator-stabilizer 36. To reiterate, the right wing trailing portion 28, the right fuselage portion 22, and the right elevator leading portion 34 are substantially coplanar and are dihedrally related along the keel fold line to the plane of wing portion 26, fuselage portion 20, and elevator portion 32.

A forward, second fold line 38 is formed extending between the wing tips 40, 42; and those portions of the body member 12 forward thereof are bent slightly upwardly with respect to the keel line 24 so that the left forward portion 44 of the wing 30 is dihedrally related to left wing trailing portion 26 along the forward fold line 38. Similarly, the right leading wing portion 46 is dihedrally related to the left trailing wing portion 28. In consequent fashion the nose portion 16 is also effectively bent upwardly so that it may be considered that if the keel extends from tip to tip of the body member 12, it is bent upwardly at its intersection 48 with the forward fold line.

In like manner, the after portions of the body member are also folded somewhat upwardly along a rear fold line 50 which extends between the tips 52, 54 of the elevator 36. These upwardly bent members are the rear, or trailing, left elevator portion 56, the right trailing elevator portion 58, and, in this example, the tail portion 18.

The dihedral-like relation of the forward wing portions and the trailing elevator portions with respect to remainder portions of the body member 12 is shown more clearly in FIGURE 2. The keel forming fold line 24 is seen to extend from the nose portion 16 to the tail portion 18 with upward bends at the intersection 48 as well as the intersection 60 where the rear fold line 50 meets the fold line 24. Again, it may be pointed out that on each side of the keel 24, a rear wing portion, a fuselage side portion, and a leading elevator portion are substantially planar. It should further be noted from the elevational presentation of FIGURE 2, that it is apparent that the overall configuration of the craft as viewed from below is convex thus giving rise, in part, to the exceptional aerodynamic stability of the kite apparatus 10 in addressing relatively upwardly and rearwardly directed wind currents.

Referring again to FIGURE 1 and FIGURE 2, a tether cord 62 is shown affixed to a coupling loop 64 which, in turn, is secured to a reinforcing disc 66 which is disposed, in this example, at the intersection 48.

In FIGURE 3, the rearwardly directed sectional view illustrates the dihedral angle relation of fuselage sides 20, 22 and the forward elevator portions 32, 34. Also illustrated in this view is the rear fold line 50 extending between the tip portions 52, 54 of the elevator 36.

Referring to FIGURE 4, the dihedral relation between the forward portion 46 and trailing portion 28 along the forward fold line 38 of the wing 30 is shown.

It may be noted that in FIGURE 4, as well as in the subsequent figure, the example of the invention presented is of the character molded from polyurethane foam or other lightweight rigid expanded cellular formaceous materials. In contrast, the previous figures illustrate the invention in its thinner sheet form, the material of which may be non-expanded styrene, which may be fabricated by conventional vacuum forming techniques.

In FIGURE 5, the forwardly viewing section illustrates the cast-in emplacement of the coupling loop 64 and the reinforcing disc 66 in the region of the intersection 48 between the keel forming fold line 24 and the forward fold line 38 which extends between the wing tip portions 40, 42. The upwardly bent nose portion 16 and forward wing portions 44, 46 are also illustrated in this view.

There have thus been disclosed and described a number of aspects of different examples of a kite apparatus which achieves the objects and exhibits the advantages set forth hereinabove.

What is claimed is:

1. Kite apparatus comprising:
   a body member formed in a monolithic lightweight substantially rigid sheet configuration and having a fuselage portion with nose and tail portions, an elevator-stabilizer with tip and leading and trailing portions and a wing with tip and leading and trailing portions, said body member being formed to define a longitudinal dihedral, keel-like fold line extending from said nose portion to said tail portion and along which said elevator-stabilizer, fuselage, and wing portions are, in symmetrically dihedral fashion, folded upwardly,
   said body member being formed also to define a wing fold line along the length of said wing and extending between its said tip portions and along which its said leading portions along with said nose portion are folded dihedrally upwardly with respect to its said trailing portions,
   said body member being formed also to define a tail fold line along the length of said elevator-stabilizer and extending between its said tip portions and along which its said trailing portions are folded dihedrally upwardly with respect to its said leading portions.

2. The invention according to claim 1 which further includes tether line securing means formed integrally with said body member and disposed approximately at the intersection of said keel-like fold line and said wing fold line.

3. The invention according to claim 1 in which said body member is formed overall in the plan silhouette of a conventional airplane.

4. The invention according to claim 1 in which said body member is formed of relatively thin substantially rigid plastic sheet material.

5. The invention according to claim 1 in which said body member is molded of substantially rigid formaceous plastic material.

6. Kite apparatus having an overall monolithic sheet formed in the shape generally of the plan silhouette of a conventional airplane and further having a body member comprising:
   a fuselage with left and right side, nose, and tail portions;
   a wing and an elevator stabilizer each having left and right tip, left and right leading, and left and right trailing portions;
   said body member having a keel forming longitudinal fold line extending centrally of said fuselage from said nose to said tail portion, said keel fold line forming symmetrical halves of said body member with a dihedral angle therebetween,
   said left trailing portion of said wing, said left fuselage side portion, and said left leading portion of said elevator lying substantially in a single plane,
   said right trailing portion of said wing, said right fuselage side portion, and said right leading portion of said elevator lying substantially in a single plane,
   said body member being formed to define transverse forward and rear fold lines,
       said forward fold line extending between said left and right wing tip portions with said wing leading portions and said nose portion being folded upwardly, with respect to said keel fold line, along said forward fold line,
       said rear fold line extending between said left and right elevator tip portions with said trailing elevator portions and said tail portion being folded upwardly, with respect to said keel fold line, along said rear fold line.

7. The invention according to claim 6 in which said body member is formed of relatively thin substantially rigid plastic sheet material.

8. The invention according to claim 6 in which said body member is molded of a relatively thick sheet of substantially rigid, expanded cellular, formaceous plastic material.

No references cited.

FERGUS S. MIDDLETON, *Primary Examiner.*

P. E. SAUBERER, *Assistant examiner.*